(12) United States Patent
Hosoi

(10) Patent No.: US 8,134,063 B2
(45) Date of Patent: Mar. 13, 2012

(54) MUSIC PIECE PRODUCTION APPARATUS, MUSIC PIECE REPRODUCTION METHOD, AND MUSIC PIECE REPRODUCTION PROGRAM

(75) Inventor: Masayuki Hosoi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 61 days.

(21) Appl. No.: 12/532,497

(22) PCT Filed: Mar. 28, 2007

(86) PCT No.: PCT/JP2007/056640
§ 371 (c)(1),
(2), (4) Date: Oct. 14, 2009

(87) PCT Pub. No.: WO2008/120310
PCT Pub. Date: Oct. 9, 2008

(65) Prior Publication Data
US 2010/0114342 A1 May 6, 2010

(30) Foreign Application Priority Data
Mar. 26, 2007 (EP) .................... 07104914

(51) Int. Cl.
*G10H 1/00* (2006.01)
*G10H 1/18* (2006.01)
*G10H 7/00* (2006.01)
(52) U.S. Cl. ........................................ 84/615
(58) Field of Classification Search ........... 84/615, 84/653
See application file for complete search history.

(56) References Cited

U.S. PATENT DOCUMENTS

| | | | | |
|---|---|---|---|---|
| 6,657,116 B1* | 12/2003 | Gunnerson | ................... | 84/615 |
| 7,143,102 B2* | 11/2006 | Fiennes et al. | ................ | 707/621 |
| 7,220,910 B2* | 5/2007 | Plastina et al. | ................. | 84/615 |
| 7,256,341 B2* | 8/2007 | Plastina et al. | ................. | 84/615 |
| 7,262,357 B2* | 8/2007 | Plastina et al. | ................. | 84/615 |
| 7,345,234 B2* | 3/2008 | Plastina et al. | ................. | 84/615 |
| 7,358,434 B2* | 4/2008 | Plastina et al. | ................. | 84/615 |
| 7,917,477 B2* | 3/2011 | Hutson et al. | ................. | 707/668 |

FOREIGN PATENT DOCUMENTS

| | | |
|---|---|---|
| JP | 2005-071440 | 3/2005 |
| JP | 2005-084336 | 3/2005 |
| JP | 2005-285285 | 10/2005 |
| JP | 2006-092430 | 4/2006 |

OTHER PUBLICATIONS

International Search Report—PCT/JP2007/056640—May 1, 2007.

\* cited by examiner

*Primary Examiner* — Jeffrey Donels
(74) *Attorney, Agent, or Firm* — Young & Thompson

(57) ABSTRACT

A music reproduction apparatus selects some music pieces from a number of music pieces stored in, for example, a storage medium and reproduces them. First, a plurality of music piece selection periods (episode) are set on the basis of user specific information inputted by the user. The music piece selection periods are a time unit which is a unit in reproducing a music piece. Next, a music piece reproduction list (playlist) is generated for each music piece selection period and a music piece is reproduced according to the music piece reproduction list. The user can input evaluation information for the reproduction of the music piece. As a result, the music piece selection periods or the music piece reproduction list is changed and reproduced by using the user evaluation information, thus enabling the user who has listened to the music to have an effect such as energy, relaxation, or briskness, which is the biggest goal.

10 Claims, 9 Drawing Sheets

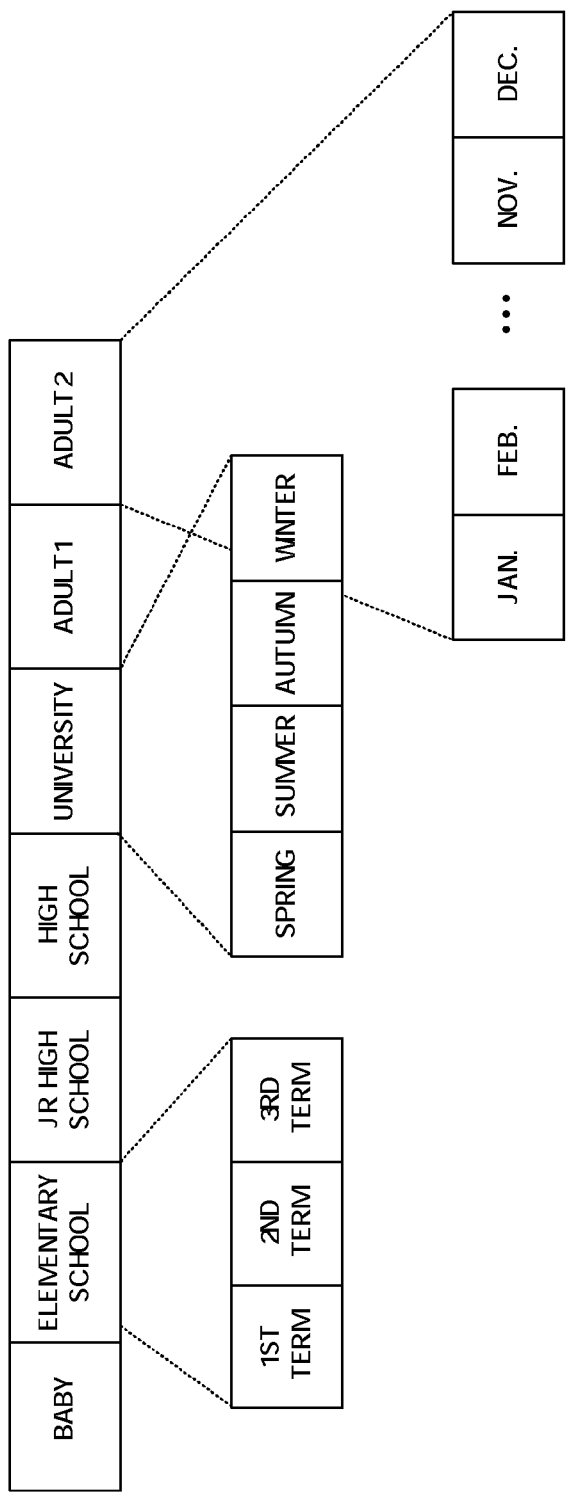

FIG. 3A

<REPRODUCTION EXAMPLE 1>

| BABY | ELEMENTARY SCHOOL | JR. HIGH | HIGH SCHOOL | UNIV. | ADULT 1 | ADULT 2 |

→ TIME

FIG. 3B

<REPRODUCTION EXAMPLE 2>

| ADULT 2 | ADULT 1 | UNIV. | HIGH SCHOOL | JR. HIGH | ELEMENTARY SCHOOL | BABY |

→ TIME

FIG. 3C

<REPRODUCTION EXAMPLE 3>

| BABY | ELEMENTARY SCHOOL | ADULT 1 | JR. HIGH | ADULT-2 | HIGH SCHOOL | UNIV. |

→ TIME

FIG. 4

| MUSIC PIECE ID | LISTENING PROBABILITY | | | | | | | REQUEST NUMBER | REPRODUCTION NUMBER | LISTENING FRESHNESS [TIME] |
| --- | --- | --- | --- | --- | --- | --- | --- | --- | --- | --- |
| | BABY | ELEMEN-TARY | JR HIGH | HIGH | UNIV. | ADULT1 | ADULT2 | | | |
| 00001 | 0.05 | 0.05 | 0.1 | 0.3 | 0.2 | 0.15 | 0.15 | 3 | 5 | 75 |
| 00002 | 0 | 0.05 | 0.25 | 0.1 | 0.1 | 0.2 | 0.2 | 1 | 2 | 282 |
| · | · | · | · | · | · | · | · | · | · | · |
| · | · | · | · | · | · | · | · | · | · | · |
| XXXXX | · | · | · | · | · | · | · | · | · | · |

FIG. 5A

MUSIC PIECE REPRODUCTION LIST:P010 (EPISODE :ELEMENTARY SCHOOL)

| MUSIC PIECE A (WHOLE) | MUSIC PIECE B (INTRODUCTION ONLY) | MUSIC PIECE C (1ST PART ONLY) | MUSIC PIECE D (WHOLE) |
|---|---|---|---|

MUSIC PIECE REPRODUCTION LIST:P236 (EPISODE :ADULT1)

| MUSIC PIECE E (WHOLE) | MUSIC PIECE F (2m05s~4m10s) | MUSIC PIECE G (WHOLE) | MUSIC PIECE H (WHOLE) | MUSIC PIECE I (WHOLE) |
|---|---|---|---|---|

FIG. 5B

| MUSIC PIECE REPRODUCTION LIST | | | | | | | |
|---|---|---|---|---|---|---|---|
| REPRODUCTION EFFECT | BABY | ELEMENTARY | JR HIGH | HIGH | UNIV. | ADULT1 | ADULT2 |
| VIGOROUS | P001 | P010 | P133 | P225 | P552 | P178 | P236 |
|  | P125 | P002 | P551 | P456 | P352 | P222 | P269 |
| · | · | · | · | · | · | · | · |
| RELAXED | · | · | · | · | · | · | · |
|  | · | · | · | · | · | · | · |
|  | · | · | · | · | · | · | · |
| REFRESHING | · | · | · | · | · | · | · |
|  | · | · | · | · | · | · | · |

MUSIC PIECE PRODUCTION APPARATUS, MUSIC PIECE REPRODUCTION METHOD, AND MUSIC PIECE REPRODUCTION PROGRAM

TECHNICAL FIELD

The present invention relates to a music piece reproduction apparatus which reproduces a plurality of music pieces.

BACKGROUND TECHNIQUE

Recently, a storage medium such as a hard disc drive (HDD) and a flash memory has large storage capacity, and it becomes possible to store a large number of music pieces in the storage medium. In this case, there is such a problem that selecting the music piece, i.e., the search for the music pieces becomes difficult. In this view, the patent Reference-1 discloses an apparatus which automatically reproduces music pieces of desired date if a user inputs his or her date of birth. Also, the patent Reference-2 discloses an apparatus which estimates the atmosphere of the place based on the speech information of a user and reproduces music pieces matching the estimated atmosphere.

However, in case that a large number of music pieces are stored in the storage medium, there is a possibility that some of the music pieces are not selected and reproduced even if the above-mentioned methods are used. There is a problem that the music pieces that the user used to listen or the user had a chance to listen in the past are not reproduced. Also, according to a method of mainly reproducing favorite music pieces, the favor is not even, and there is little chance to meet new music. As a result, the user listening to the music cannot enjoy its largest effect, i.e., vigor, relaxation and refreshment.

Patent Reference-1: Japanese Patent Application Laid-open under No. 2005-84336
Patent Reference-2: Japanese Patent Application Laid-open under No. 2006-92430

DISCLOSURE OF INVENTION

Problem to be Solved by the Invention

The above is one example of the problems to be solved by the present invention. It is an object of the present invention to enable the reproduction of wide and various music pieces based on the user's own information and to provide the user with the largest object of listening to the music, i.e., the vigorous, relaxed and refreshing effect, when a large number of music pieces are prepared.

Means for Solving the Problem

One embodiment is a music piece reproduction apparatus comprising: a music piece selecting period setting unit which sets plural music piece selecting periods based on user's own information; a music piece reproduction list producing means which produces a music piece reproduction list based on the user's own information for each of the music piece selecting period; a reproducing unit which reproduces the music pieces according to the music piece reproduction list; and an evaluation information inputting means which receives user's evaluation information for the music pieces reproduced by the reproducing means.

Another embodiment is a music piece reproduction method comprising: a music piece selecting period setting process which sets plural music piece selecting periods based on user's own information; a music piece reproduction list producing process which produces a music piece reproduction list based on the user's own information for each of the music piece electing period; a reproducing process which reproduces the music pieces according to the music piece reproduction list; and an evaluation information inputting process which receives user's evaluation information for the music pieces reproduced by the reproducing means.

An additional embodiment is a music piece reproduction program executed by a computer, making the computer function as: a music piece selecting period setting unit which sets plural music piece selecting periods based on user's own information; a music piece reproduction list producing means which produces a music piece reproduction list based on the user's own information for each of the music piece electing period; a reproducing unit which reproduces the music pieces according to the music piece reproduction list; and an evaluation information inputting means which receives user's evaluation information for the music pieces reproduced by the reproducing means.

BRIEF DESCRIPTION OF THE DRAWINGS

FIGS. 2A and 2B show examples of music piece selecting period (episode and sub-episode);
FIGS. 3A to 3C show examples of a reproduction time and a reproduction order of music pieces for every episode;
FIG. 4 shows examples of parameters for producing a music piece reproduction list;
FIGS. 5A and 5B show examples of correspondence table of reproduction effect and music piece reproduction list.

BRIEF DESCRIPTION OF REFERENCE NUMBERS

Figure 1:
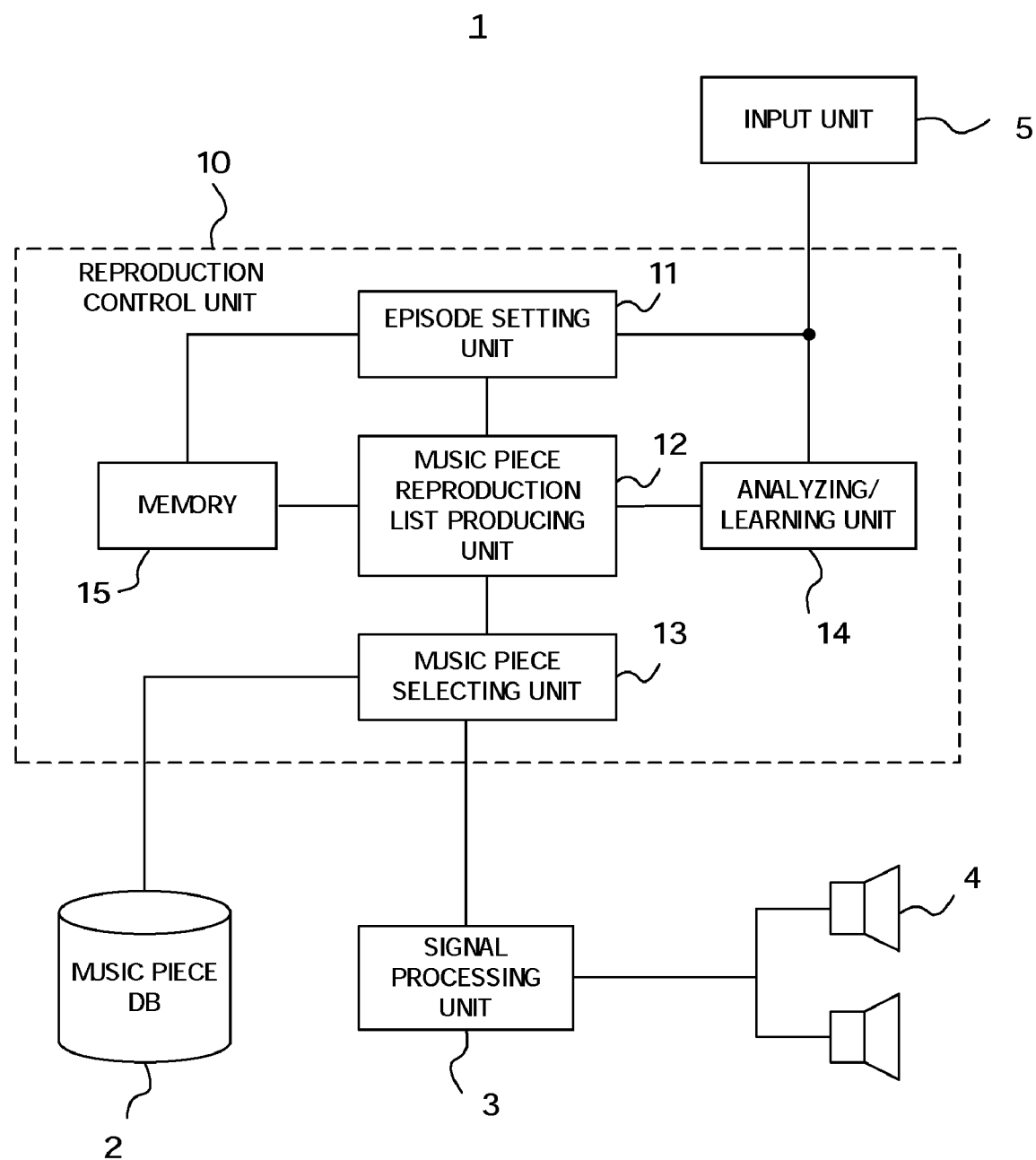
FIG. 1 shows a schematic configuration of a music piece reproduction apparatus according to an embodiment of the present invention.

1 Music piece reproduction apparatus
2 Music piece database (DB)
3 Signal processing unit
4 Speaker
5 Input unit
10 Reproduction control unit

DETAILED DESCRIPTION OF THE PREFERRED EMBODIMENTS

According to one aspect of the present invention, there is provided a music piece reproduction apparatus comprising: a music piece selecting period setting unit which sets plural music piece selecting periods based on user's own information; a music piece reproduction list producing means which produces a music piece reproduction list based on the user's own information for each of the music piece selecting period; a reproducing unit which reproduces the music pieces according to the music piece reproduction list; and an evaluation information inputting means which receives user's evaluation information for the music pieces reproduced by the reproducing means.

The above music piece reproduction apparatus selects and reproduces some music pieces from a large number of music pieces stored in a storage medium, for example. First, plural music piece selecting period (episode) are set based on the user's own information inputted by the user. The music piece selecting period is a time period serving as a unit in reproducing the music piece. Next, the music piece reproduction list (playlist) is produced for each music piece selecting period, and the music pieces are reproduced according to the music piece reproduction list. The user can input the evaluation information for the episode and/or the reproduction of the music piece. Thus, by using the user's evaluation information, it is possible to give the effect, i.e., the largest aim, such as the vigor, the relaxation and the refreshment, to the user who listens to the music pieces.

In a preferred example, the music piece selecting period may be determined by dividing the growth process of people into a plurality of periods. For example, the music piece selecting period may be based on the days such as "elementary school days", "junior high school days" and "adult days". In a preferred example, the evaluation information includes the reproduction evaluation inputted by the user during the reproduction of the music piece and the reproduction effect inputted by the user after the reproduction of the music piece.

In one feature of the music piece reproduction apparatus, the music piece selecting period setting unit changes the plural music piece selecting periods based on the user' evaluation information. In another feature of the music piece reproduction apparatus, the music piece reproduction list producing means changes contents of the music piece reproduction list based on the user's evaluation information. In a preferred example, the user's evaluation information includes the evaluation information for each of the music piece selecting periods. By this, since the music piece selecting period and the music piece reproduction list are changed in accordance with the user's evaluation information, it is possible to give the effect, i.e., the largest aim, such as the vigor, the relaxation and the refreshment, to the user who listens to the music pieces.

In another feature of the music piece reproduction apparatus, a reproduction effect designating means which receives a designation of reproduction effect by the user at a time of reproducing the music pieces is further provided, and the music piece reproduction list producing means comprises: a storage means which stores the music piece reproduction list and the reproduction effect corresponding to the music piece reproduction list in association with each other; and a producing means which produces, when the reproduction effect is designated by the reproduction effect designating means, the music piece reproduction list by considering the music piece reproduction list corresponding to the designated reproduction effect.

In this feature, the reproduction effect inputted by the user after the reproduction of the music piece and the music piece reproduction list at that time are stored in association with each other. Therefore, when the user instructs the reproduction of music pieces with designating the reproduction effect, the reproduction of the music pieces is carried out in such a manner that the user can easily obtain the designated effect.

In another feature of the music piece reproduction apparatus, the music piece selecting period setting means further divides a music piece selecting period into a plurality of music piece selecting periods. For example, based on the reproduction evaluation input of each episode or music piece by the user, one music piece selecting period may be further divided into a plurality of music piece selecting periods. Also, even if the reproduction evaluation is not inputted by the user, one music piece selecting period may be divided into a plurality of music piece selecting periods based on the reproduction number of times for each episode or music piece. Thus, the music piece selecting period that the user is interested in may be further divided to perform various music piece reproduction.

Another feature of the music piece reproduction apparatus, further comprises a listening probability storing means which stores a listening probability indicating a probability of listening to the music piece for each of the plural music piece selecting periods, and the music piece reproduction list producing means determines contents of the music piece reproduction list based on the listening probability. Thus, it is possible to reproduce the music piece that the user would listen to during each of the music piece selecting periods.

According to another aspect of the invention, there is provided a music piece reproduction method comprising: a music piece selecting period setting process which sets plural music piece selecting periods based on user's own information; a music piece reproduction list producing process which produces a music piece reproduction list based on the user's own information for each of the music piece electing period; a reproducing process which reproduces the music pieces according to the music piece reproduction list; and an evaluation information inputting process which receives user's evaluation information for the music pieces reproduced by the reproducing means. Thus, by using the user's evaluation information, it is possible to give the effect, i.e., the largest aim, such as the vigor, the relaxation and the refreshment, to the user who listens to the music pieces.

According to still another aspect of the invention, there is provided a music piece reproduction program executed by a computer, making the computer function as: a music piece selecting period setting unit which sets plural music piece selecting periods based on user's own information; a music piece reproduction list producing means which produces a music piece reproduction list based on the user's own information for each of the music piece electing period; a reproducing unit which reproduces the music pieces according to the music piece reproduction list; and an evaluation information inputting means which receives user's evaluation information for the music pieces reproduced by the reproducing means. Thus, by using the user's evaluation information, it is possible to give the effect, i.e., the largest aim, such as the vigor, the relaxation and the refreshment, to the user who listens to the music pieces.

Embodiment

A preferred embodiment of the present invention will be described below with reference to the attached drawings.

In this embodiment, a music piece reproduction apparatus sets a plurality of music piece selecting periods bases on user's own information. The music piece selecting period is a time unit at the time of selecting music pieces to be reproduced. For example, by dividing a growth process of people into a plurality of periods, the music piece selecting period may be set as "baby days", "elementary school days", "junior high school days" and "adult days". In another example, the sexagenary cycle, or periods of one to several years may be the music piece selecting period. Hereinafter, the music piece selecting period is referred to as "episode".

FIG. 1 shows a schematic configuration of a music piece reproduction apparatus according to an embodiment. As shown, the music piece reproduction apparatus 1 includes a music piece database (DB) 2, a signal processing unit 3, a speaker 4, an input unit 5 and a reproduction control unit 10.

The input unit 5 is operated by a user at the time of inputting information and/or selecting options. The input unit 5 may be a remote-controller, an operation panel and a touch panel, according to the form of the music piece reproduction apparatus 1. Also, the input unit 5 may include a speech input device utilizing speech recognition technique.

The input unit 5 is first used for inputting user's own information, such as date of birth, birthplace, sex and family relationship, to the music piece reproduction apparatus 1. Although the detail will be described later, the music piece reproduction apparatus 1 of this embodiment has an automatic mode, a reproduction effect designating mode and an episode designating mode, and the input unit 5 is used to designate one of those three modes. Further, when the user selects the reproduction effect designating mode as the reproduction mode, the input unit 5 is used by the user to designate the desired reproduction effect. Still further, when the user designates the episode designating mode as the reproduction mode, the input unit 5 is used by the user to designate the desired episode.

The music piece DB 2 may be formed by a storage medium such as a HDD or a flash memory, and stores a number of music piece data. The format of the music piece data is not limited. Although the music piece DB 2 is provided in the music piece reproduction apparatus 1 in the embodiment shown in FIG. 1, the application of the invention is not limited to this example. For example, if the music piece reproduction apparatus 1 has a communication means utilizing a network, the music piece data may be downloaded from the music piece DB of a music piece providing server on the internet, if necessary. Note that, even in such a case, the database in the music piece reproduction apparatus 1 stores index information of the music pieces, if necessary.

The signal processing unit 3 performs signal processing, e.g., a decode processing, necessary for the reproduction of the music piece data read out from the music piece DB 2, and supplies the analog sound signal corresponding to the music piece to the speaker 4. The speaker 4 outputs the sound signal thus supplied. Although the speaker 4 is shown as the sound output device in the example of FIG. 1, the sound may be outputted by the earphone, instead.

The reproduction control unit 10 includes an episode setting unit 11, a music piece reproduction list producing unit 12, a music piece selecting unit 13, an analyzing/learning unit 14 and a memory 15.

The episode setting unit 11 sets a plurality of episodes based on the user's own information inputted via the input unit 5. As mentioned above, by dividing the growth process of people into several periods (time units), the examples of the episode may be classified by "baby days", "elementary school days", "junior high school days", "high school days" and so on. In this case, the episode setting unit 11 may set the episode of "elementary school days", "junior high school days" and "adult days" based on the information associated with the educational background and the business experience, serving as the user's own information. FIG. 2A shows a typical example of plural episodes. In this example, the episodes "baby days", "elementary school days", "junior high school days", "high school days", "university days", "adult days-1" and "adult days-2" are set. As described above, since the episode is set based on the user's own information, whether the episode includes "university days" or not, or the number of the episode "adult days" can be different between different users.

Other than the above example, the episode may be set based on the classification of the sexagenary cycle, or the breakpoint such as the change of school, the change of workplace in a company, and the change of job. Further, as shown in FIG. 2B, one episode may be divided into a plurality of episodes (hereinafter referred to as "sub-episode"). The example of the sub-episode includes the division by school terms such as first to third school terms in school, the division by four seasons and the division by months. In the following description, unless particularly mentioned, the term "episode" includes "sub-episode".

The music piece reproduction list producing unit 12 produces a music piece reproduction list (playlist) for each of the plurality of episodes set by the episode setting unit 11. The "music piece reproduction list" is a list for successively reproducing a plurality of music pieces, and specifically includes identification information of the music pieces to be reproduced, the reproduction order of those music pieces, the reproduction segment (a part to be reproduced) of each music piece and a reproduction length of each music piece. The music piece reproduction list producing unit 12 basically produces the music piece reproduction list by using the user's own information inputted by the user. For example, the music piece reproduction list producing unit 12 selects the music pieces popular in each time period and includes them into the music piece reproduction list of each episode, based on the date of birth, the birth place, the history (educational background, business experience). In addition, the music piece reproduction list producing unit 12 produces the music piece reproduction list, for each episode, including the music pieces that the user wants to listen to, by using the parameters such as the listening probability, the requested number, the reproduction number and the reproduction freshness of each music pieces by the user. The method of producing the music piece reproduction list using those parameters will be described later in detail.

The music piece selecting unit 13 obtains the music piece data from the music piece DB 2 based on the music piece reproduction lies produced by the music piece reproduction list producing unit 12, and supplies it to the signal processing unit 3. The signal processing unit 3 applies necessary signal processing to the music piece data supplied from the music piece selecting unit 13, and supplies the music piece data to the speaker 4.

The memory 15 stores various data necessary for the setting of the episode by the episode setting unit 11 and the production of the music piece reproduction list by the music piece reproduction list producing unit 12.

The analyzing/learning unit 14 analyzes the user's input during or after the reproduction of the music piece, and reflects it to the setting of the episode by the episode setting unit 11 and/or the production of the music piece reproduction list by the music piece reproduction list producing unit 12. Specifically, the preference degree of the music piece can be evaluated if the user performs the reproduction control input such as "skip", "repeat" and "cancel" during the reproduction of the music piece. Hereinafter, the reproduction control input performed by the user during the reproduction of the music piece will be referred to as "reproduction evaluation". The analyzing/learning unit 14 can judge that the user does not like the music piece which was skipped or canceled and that the user likes the music piece which was repeated.

Further, the analyzing/learning unit 14 may configured such that the reproduction evaluation such as the "skip" and "repeat" can be inputted, during the reproduction of the music piece, not on the music piece basis, but on the episode basis. By this, the analyzing/learning unit 14 can determine whether the user likes the music piece or the whole episode.

Further, the analyzing/learning unit 14 may configured such that, after the reproduction of the music pieces included in the music piece reproduction list is finished for all the episodes, the user can input the effect obtained by the reproduction of the music pieces. Hereinafter, the effect inputted by the user after the reproduction of the music pieces will be referred to as "reproduction effect". The examples of the reproduction effect include "vigorous", "relaxed" and "refreshing". Those reproduction effects may be prepared as the options to make the user select one of them. Also, the analyzing/learning unit 14 may be configured such that the user can define the option of the reproduction effect.

Also, the analyzing/learning unit 14 may be configured such that the user can input the reproduction effect for each of the episodes. Specifically, if the user feels the music piece for a certain episode (e.g., the university days) "refreshing" after the reproduction of a series of music pieces, the user may input the reproduction effect "refreshing" for the episode "the university days". By this, the analyzing/learning unit 14 can learn the reproduction effect that the user particularly felt for a certain episode.

The reproduction evaluation inputted by the user during the reproduction of the music piece is similar to the reproduction effect inputted by the user after the reproduction of the music piece in that both are the user's evaluation of the reproduced music piece. Therefore, the reproduction evaluation and the reproduction effect are called as "evaluation information". In addition, unless particularly mentioned, the term "evaluation information" includes the evaluation information for each of the music pieces, the evaluation information for each of the episodes and the evaluation information for the series of music pieces, as a whole, reproduced over plural episodes.

The reproduction evaluation inputted by the user during the reproduction of the music piece and the reproduction effect inputted by the user after the reproduction of the music piece are analyzed by the analyzing/learning unit 14, and is reflected to the setting of the episode and the production of the music piece reproduction list. For example, when the "skip" is inputted as the reproduction evaluation, the music piece reproduction list producing unit 12 may erase the music piece from the music piece reproduction list for the next time, or shorten the reproduction time of the music piece. Specifically, "shortening the reproduction time" is to reproduce only a part of the music piece (e.g., only the first part, only the introduction part). Namely, not the whole part of the music piece, but only a part of the music piece is reproduced for the music piece whose evaluation is not so high, or the music piece in the episode whose evaluation is not so high. If the "repeat" is inputted, the music piece may be included in a different music piece reproduction list corresponding to the same episode. Further, the reproduction time of the episode, for which the skip is inputted more than a predetermined number of times, may be adjusted and shortened.

The music piece reproduction list producing unit 12 may change the reproduction time (the number of music pieces) on the episode basis and/or the reproduction order on the episode basis according to the reproduction effect. For example, if "vigorous" is inputted as the reproduction effect, the reproduction time of the episode "elementary school days" is made longer. Also, the genre of the music piece included in the music piece reproduction list may be selected based on the reproduction effect.

If the instruction of "request" or "skip" on the episode basis or the music piece basis, i.e., the reproduction evaluation, is not inputted, the length of the music piece selecting period or the reproduction order may be changed according to the number of times of reproduction (the number of times that the reproduction according to this invention is performed). For example, if the number of times of reproduction becomes more than 10 times, each episode may be divided (into sub-episodes) or the reproduction time of each episode may be longer, even if the reproduction evaluation is not inputted.

As described above, in this embodiment, since a plurality of episodes are set to reproduce the music pieces, the music pieces of plural episodes can be reproduced in the old-to-new order, the new-to-old order or the random order in time, thereby giving the user various feeling. The user may input the total time for the reproduction of the music pieces, and the music reproduction time of each episode may be determined based on the total time.

FIGS. 3A to 3C show the examples in which the reproduction time and the reproduction order are changed on the episode basis. In each figure, the length in the time axis direction of the block showing the episode indicates the reproduction time. In the example of FIG. 3A, the music piece of each episode is reproduced in an order from old one to new one, i.e., in an order of the growth process of people from the baby to the adult. In the "elementary school days" and the "adult-1 days", the reproduction time (the number of the music pieces) is longer than other episode. In FIG. 3B, the music piece of each episode is reproduced in an order from new one to old one, i.e., in an order going back the passage of time from the adult to the baby. In FIG. 3C, the reproduction order on the episode basis is determined randomly, and is not related to the passage of time.

Next, the description will be given of a method of producing the music piece reproduction list on the episode basis. The production of the music piece reproduction list on the episode basis is performed based on the statistical processing. Specifically, the following parameters are used. The example of each parameter is shown in FIG. 4. As shown in FIG. 4, the following parameters are set for each music piece and are stored in the memory 15 of the reproduction control unit 10.

(1) Listening Probability

The "listening probability" is a probability that the user would listen to the music piece, and is set on the episode basis. The listening probability is calculated based on the user's own information (the date of birth, the character, the birthplace), and is set and stored. Also, as shown, the listening probability is set for each music piece and for each episode. For example, the music piece reproduction list is produced such that, as the listening probability is high, the probability that the music piece is reproduced in the episode becomes high.

(2) Request Number

The "request number" is the number of times that the user requests the music piece to listen to it once again. For example, the number of times that the user inputs the repeat instruction, as the above-mentioned reproduction evaluation, during the reproduction of music piece may be used as the request number. The music piece reproduction list is produced such that the number of times of reproduction is basically high for the music piece whose request number is high.

(3) Reproduction Number

The "reproduction number" is a number of times that the music piece is actually reproduced. For example, by selecting the music piece whose reproduction number is small, the bias of the reproduced music pieces can be prevented.

(4) Listening Freshness

The "listening freshness" is represented by the passed time after the last reproduction of the music piece. As the passed time is long, the listening freshness is high. By selecting the music piece whose listening freshness is new, the bias of the reproduced music piece can be prevented.

Next, the music piece selecting algorithm using those parameters will be described. First, the music piece whose listening probability is high and whose listening freshness is new (i.e., the user does not listen lately) is selected. Next, the music piece whose reproduction number is small and whose listening freshness is new is selected. Next, the music piece whose request number is large and whose listening freshness is new is selected. By this algorithm, the music piece reproduction list can be produced for each episode.

An example of the music piece reproduction list is shown in FIG. 5A. In the example shown, the music piece reproduction list P010 corresponds to the episode "elementary school days", and includes the music pieces A to D. The music pieces A to D were popular in the elementary school days of the user. The music piece reproduction list P236 corresponds to the episode "adult days", and includes the music pieces E to I. The music pieces E to I are music pieces that the user used to listen to during the second term of the user's adult days. Also, as an example of reproducing only a part of the music piece, in the music piece reproduction list P010, the music pieces A and D are wholly reproduced, but only the introduction part is reproduced for the music piece B and only the first part is reproduced for the music piece C. In the music piece reproduction list P236, the music pieces E, G, H and I are wholly reproduced, but only the part from the reproduction time 2 min. 05 sec. to 4 min. 10 sec. is reproduced for the music piece F.

The music piece reproduction list may be produced such that, for the episode including the music pieces whose request number is high, the reproduction time is set to be long, thereby to reproduce many music pieces. Further, for the episode including the music pieces whose request number is high, the sub-episode may be set as described above. If the sub-episode has already been set for the episode including the music pieces whose request number is high, the dividing number of the sub-episode may be increased. For example, the sub-episode of four seasons (spring, summer, autumn and winter) may be changed to the sub-episode of months (January to December).

In producing the music piece reproduction list, the reproduction effect may be fed back. Specifically, when the reproduction of the music pieces for all the episodes are finished, the user is requested to input the reproduction effect as described above. Then, as shown in the example of FIG. 5B, the music piece reproduction list used for each episode and the reproduction effect corresponding to the music piece reproduction list and inputted by the user are associated with each other and stored in the memory 15 of the reproduction control unit 10. At the time of the next reproduction, if the user selects the reproduction effect designating mode as the reproduction mode, the music piece reproduction list producing unit 12 refers to the table of FIG. 5B showing the relation between the reproduction effect and the music piece reproduction list, and produces new music piece reproduction list based on the plural music piece reproduction lists corresponding to the reproduction effects designated by the user and by using the algorithm using the above-mentioned parameters. The music piece reproduction list thus produced can give the reproduction effect designated by the user with high possibility.

In the above configuration, the episode corresponds to the music piece selecting period, the episode setting unit 11 corresponds to the music piece selecting period setting unit of the invention, and the music piece reproduction list producing unit corresponds to the music piece reproduction list producing means. Also, the music piece selecting unit 13 and the signal processing unit 3 correspond to the reproducing means, the input unit 5 corresponds to the evaluation information input means and the reproduction effect input means, and the memory 15 corresponds to the storage means and the listening probability storing means.

Figure 6:
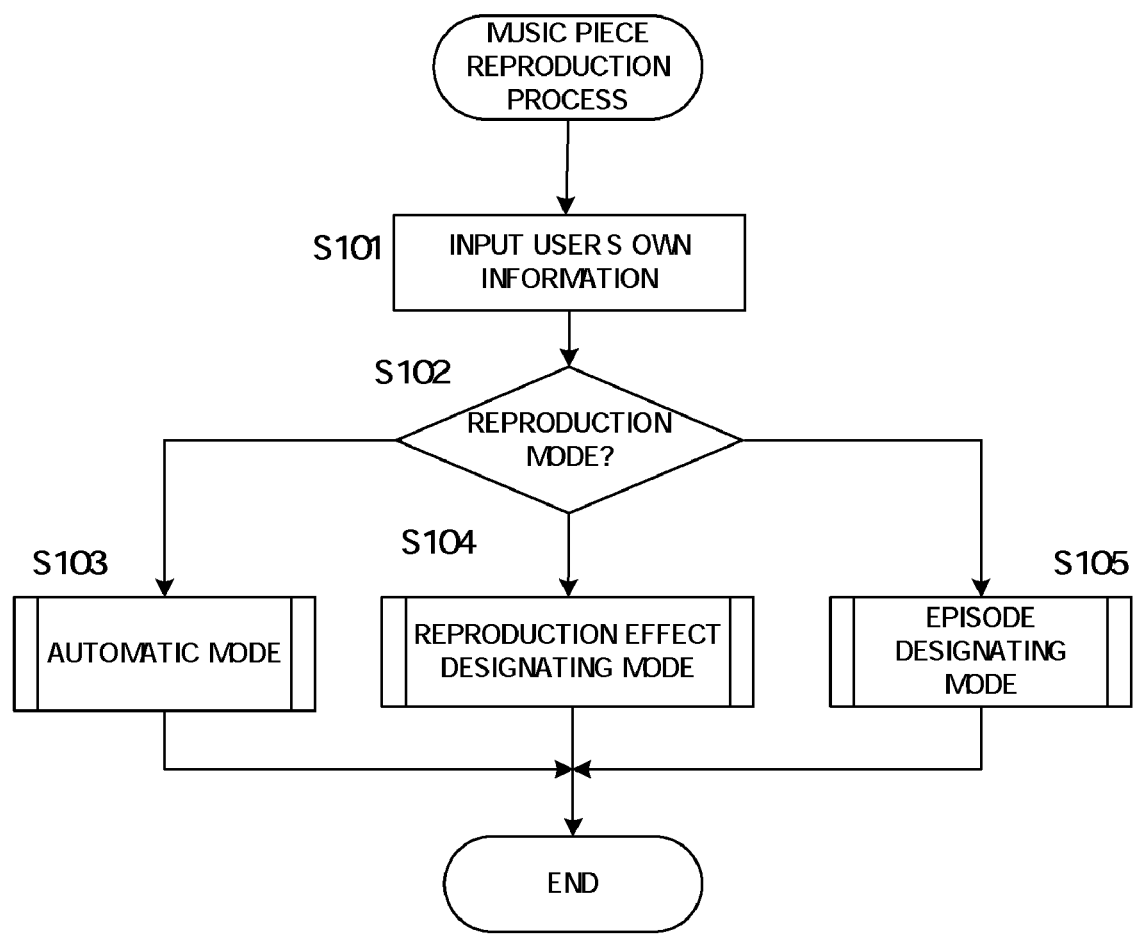
FIG. 6 is a flowchart of music piece reproduction process.

Next, the music piece reproduction process according to this embodiment will be described. FIG. 6 is a flowchart of the music piece reproduction process. In this embodiment, the reproduction mode includes an automatic mode, a reproduction effect designating mode and an episode designating mode. The process is mainly performed by the reproduction control unit 10 based on the user's input to the input unit 5.

First, the user's own information is inputted via the input unit 5 (step S101), and then the reproduction mode is selected by the user (step S102). If the automatic mode is selected, the process goes to step S103. If the reproduction effect designating mode is selected, the process goes to step S104. If the episode designating mode is selected, the process goes to step S105.

Figure 7:
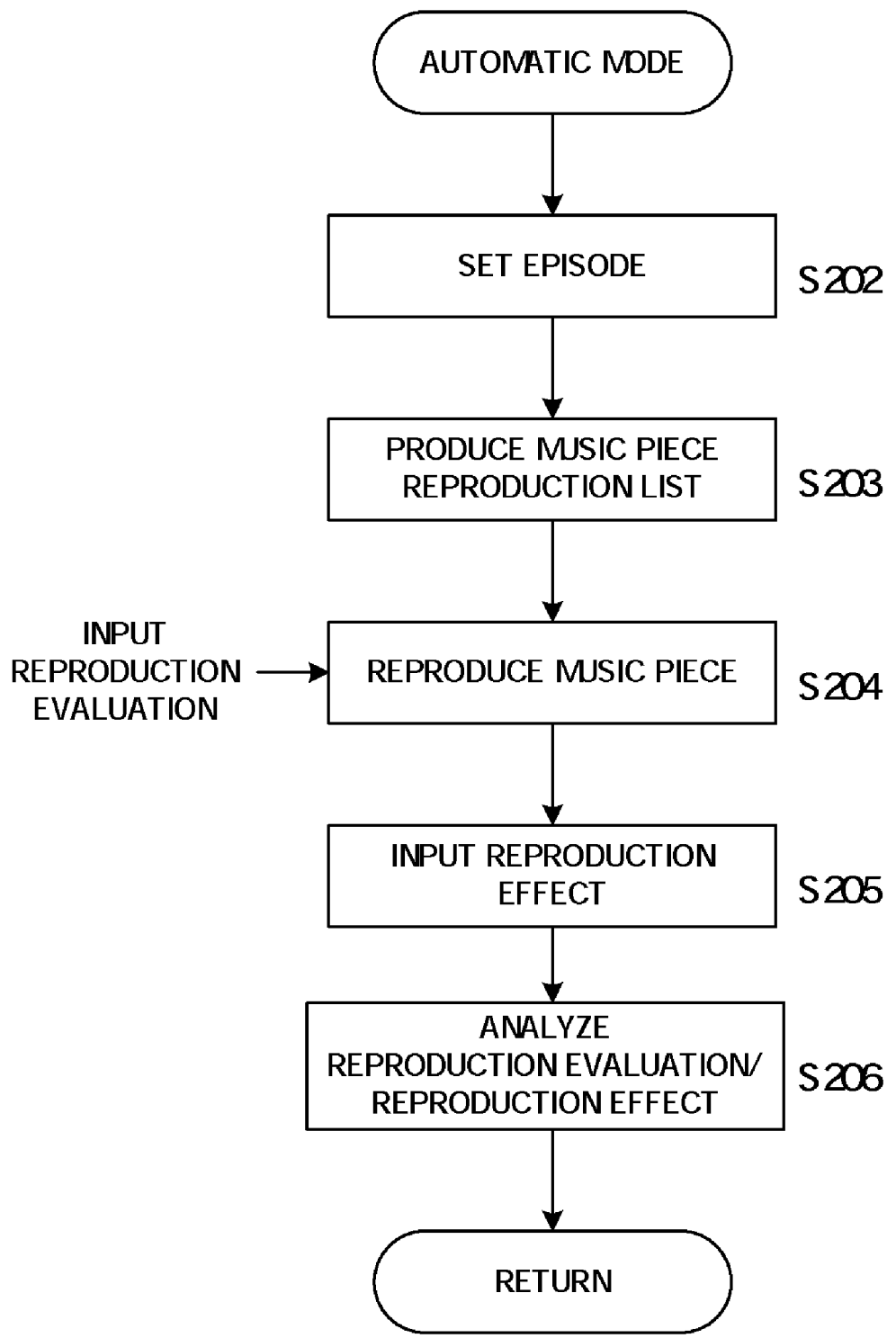
FIG. 7 is a flowchart of an automatic mode.

FIG. 7 shows the flowchart of the automatic mode. In the automatic mode, first the episode setting unit 11 sets plural episodes based on the user's own information (step S202). Next, the music piece reproduction list producing unit 12 produces the music piece reproduction list for the plural episodes thus set (step S203). When the music piece reproduction list is produced, the music piece selecting unit 13 reads out the music piece data from the music piece database 2 and supplies them to the signal processing unit 3, thereby reproducing the music pieces (step S204).

During the reproduction of the music pieces, the user can input the reproduction evaluation such as "repeat" or "skip" as described above. When the reproduction of the music pieces is finished for all the episodes, the user inputs the reproduction effect (step S205). Then, the analyzing/learning unit 14 analyzes the reproduction evaluation inputted during the reproduction of the music piece and the reproduction effect inputted after the reproduction of the music piece, and reflects them to the reproduction of the music pieces for the next time (step S206).

Figure 8:
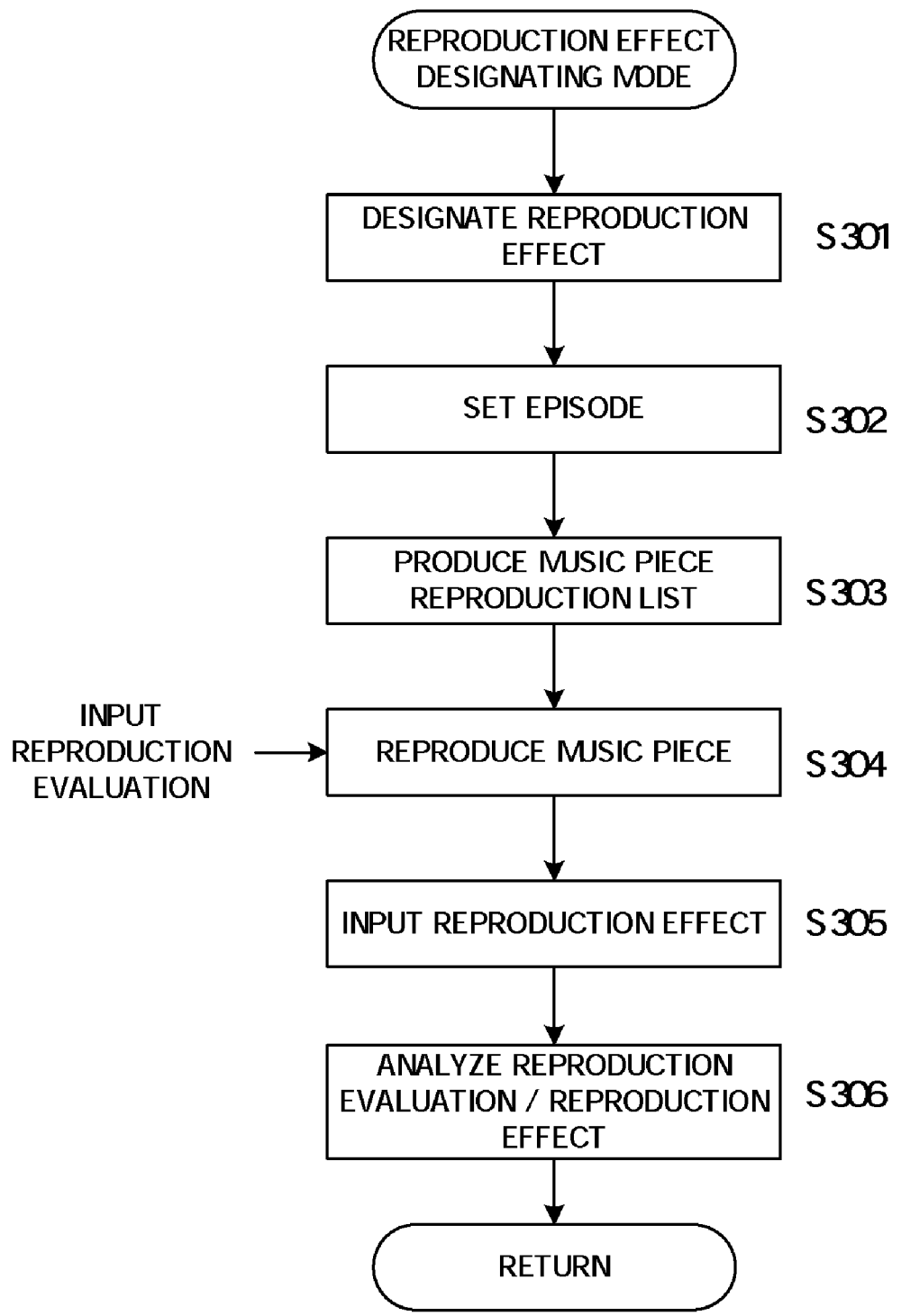
FIG. 8 is a flowchart of a reproduction effect designating mode.

FIG. 8 shows the flowchart of the reproduction effect designating mode. In the reproduction effect designating mode, first the reproduction effect is designated by the user (step S301). In accordance with the reproduction effect inputted, the episode setting unit 11 sets plural episodes (step S302). Also, the music piece reproduction list producing unit 12 refers to the relation table as shown in FIG. 5 in the above-mentioned manner to produce the music piece reproduction list for each episode (step S303). When the music piece reproduction list is thus produced, the following process is the same as that of the automatic mode shown in FIG. 7. Namely, steps S304 to S306 are the same as steps 204 to 206 shown in FIG. 7, and therefore the description thereof will be omitted.

Figure 9:
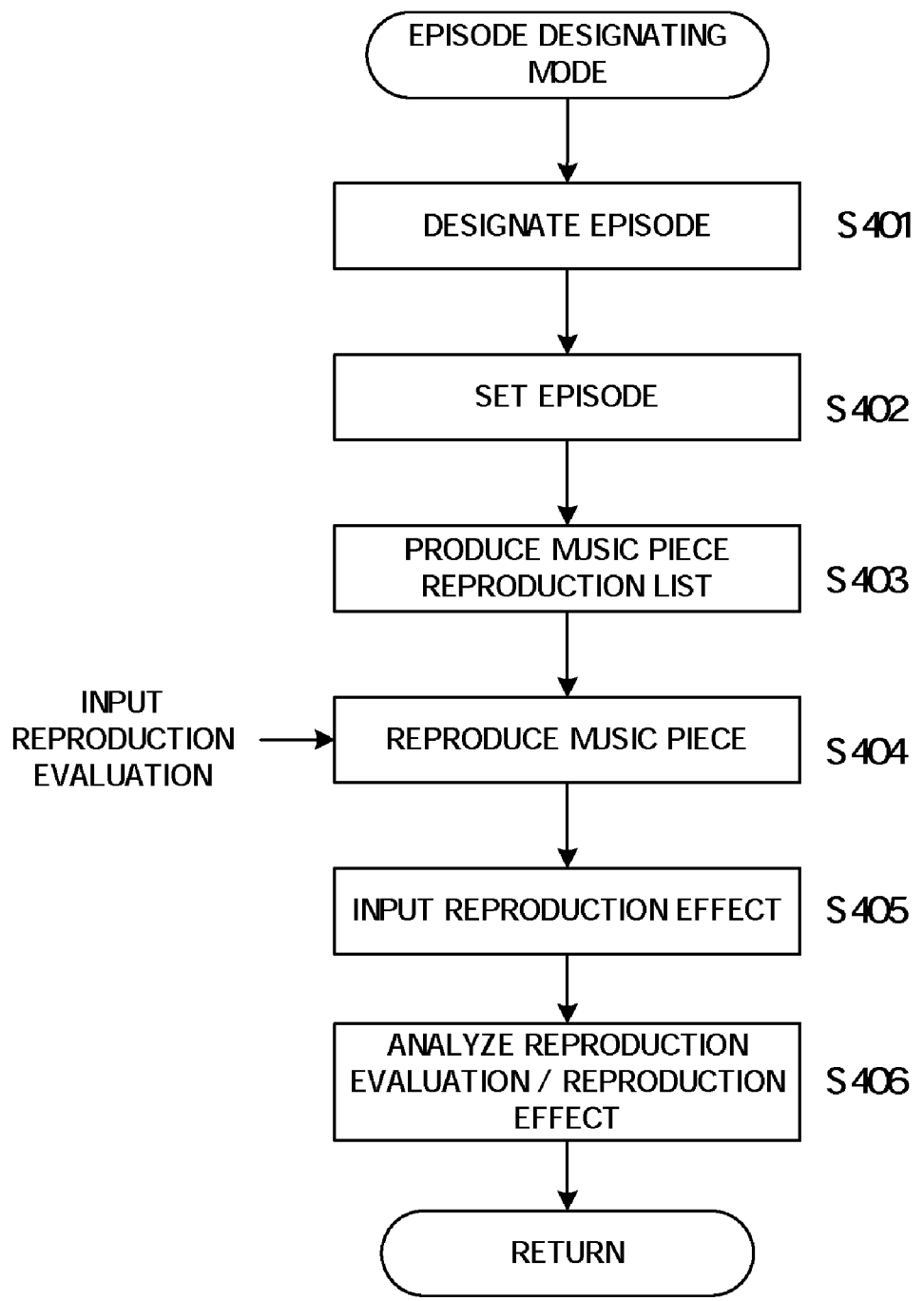
FIG. 9 is a flowchart of an episode designating mode.

FIG. 9 shows the flowchart of the episode designating mode. In the episode designating mode, first the episode is designated by the user (step S401). In this case, the episode that the user designates may be one or more. If the user designates plural episodes, the user may designate the priority order of those plural episodes. When the episode is designated, the episode setting unit 11 sets plural episodes according to the designated episodes (step S402). In this case, the episode setting unit 11 may determine only the episode designated by the user, or may add other episode.

Next, the music piece reproduction list producing unit 12 produces the music piece reproduction list for each episode (step S403). At this time, such an adjustment that the reproduction time is made long or the number of music piece is increased can be done for the episode designated by the user. If the user sets the priority order for the plural episodes, the music piece reproduction list producing unit 12 produces the music piece reproduction list to reproduce the music pieces of each episode in that order. When the music piece reproduction list is produced in this way, the following process is the same as the automatic mode shown in FIG. 7. Namely, steps S404 to S406 are the same as steps 204 to 206 shown in FIG. 7, and therefore the description thereof will be omitted.

As described above, in this embodiment, the episode setting unit sets the episodes, and the reproduction list is produced for each episode to reproduce the music pieces. The reproduction evaluation inputted by the user during the reproduction of the music piece and the reproduction effect inputted by the user after the reproduction of the music piece are analyzed and reflected to the setting of the episodes in the music piece reproduction and/or the production of the music piece reproduction list for the next time. Therefore, it is possible to reproduce broad and variety of music pieces that the user would listen, according to the memory of the user. Also, the user's memory in the past can be recalled, and the reproduction effect such as the vigor, relaxation and refreshment can be obtained. Further, by analyzing the reproduction evaluation and the reproduction effect by the user and feeding them back to the music piece reproduction in the future, the reproduction effect that the user desires can be given to the user with higher possibility.

Modified Examples

In the above embodiment, one user inputs the user's own information and the music pieces are reproduced. Alternatively, the user information of plural users may be inputted. For example, user information of a user and a person in his or her family, i.e., two persons in total, are inputted, and setting the episode and the production of the music piece reproduction list may be performed based on the user information. Further, the relationship (family relationship) of those persons may be inputted as the user information. In this case, if the parameters such as the listening probability are prepared for each user, those parameters may be combined or added with weighting thereby to produce the music piece reproduction list. For example, if the user information of a user and his or her father is inputted, the music piece reproduction list can be produced by using the listening probability of the user himself and his father with the ratio of 9:1. Thereby, the music piece that the father used to listen can be mixed and reproduced occasionally.

In the reproduction of the music piece, the opening title, the sound effect matching the season or the days, CM or suitable jingle may be reproduced between the music pieces or at the changing timing of the episode.

The playlist information may be collected by common members to analyze, and the episode and the reproduction effect (e.g., vigor, relaxation and refreshment) may be fed back. Further, by using speech recognition, the reproduction start time can be designated by the speech such as "Summer of three years ago", "Second term at second grade of junior high school", or "a sports day in elementary school".

INDUSTRIAL APPLICABILITY

This invention can be used for various music piece reproduction apparatus, such as a mini-component, a portable audio player, a car audio system, a karaoke apparatus and a cell-phone, which reproduces a large number of music pieces stored in a storage medium.

The invention claimed is:

1. A music piece reproduction apparatus comprising:
a music piece selecting period setting unit which sets plural music piece selecting periods based on user's own information;
a music piece reproduction list producing means which produces a music piece reproduction list based on the user's own information for each of the music piece selecting period;
a reproducing unit which reproduces the music pieces according to the music piece reproduction list; and
an evaluation information inputting means which receives user's evaluation information for the music pieces reproduced by the reproducing means;
wherein the music piece selecting period setting unit changes the plural music piece selecting periods based on the user's evaluation information.

2. The music piece reproduction apparatus according to claim 1, wherein the music piece reproduction list producing means changes contents of the music piece reproduction list based on the user's evaluation information.

3. The music piece reproduction apparatus according to claim 1, wherein the user's evaluation information includes evaluation information for each of the music piece selecting periods.

4. The music piece reproduction apparatus according to claim 1, further comprising a reproduction effect designating means which receives a designation of reproduction effect by the user at a time of reproducing the music pieces, wherein the music piece reproduction list producing means comprises:
a storage means which stores the music piece reproduction list and the reproduction effect corresponding to the music piece reproduction list in association with each other; and
a producing means which produces, when the reproduction effect is designated by the reproduction effect designating means, the music piece reproduction list by considering the music piece reproduction list corresponding to the designated reproduction effect.

5. The music piece reproduction apparatus according to claim 1, wherein the music piece selecting period is determined by dividing a growth process of people into a plurality of periods.

6. The music piece reproduction apparatus according to claim 1, wherein the music piece selecting period setting means divides one music piece selecting period into a plurality of music piece selecting periods.

7. The music piece reproduction apparatus according to claim 1, wherein the user's evaluation information includes a reproduction evaluation inputted by the user during the reproduction of the music piece and a reproduction effect inputted by the user after the reproduction of the music piece.

8. The music piece reproduction apparatus according to claim 1, further comprising a listening probability storing means which stores a listening probability indicating a probability of listening to the music piece for each of the plural music piece selecting periods, wherein the music piece reproduction list producing means determines contents of the music piece reproduction list based on the listening probability.

9. A music piece reproduction method comprising:
a music piece selecting period setting process which sets plural music piece selecting periods based on user's own information;

a music piece reproduction list producing process which produces a music piece reproduction list based on the user's own information for each of the music piece electing period;

a reproducing process which reproduces the music pieces according to the music piece reproduction list; and an evaluation information inputting process which receives user's evaluation information for the music pieces reproduced by the reproducing means;

wherein the music piece selecting period setting process changes the plural music piece selecting periods based on the user's evaluation information.

10. A music piece reproduction program embodied in a computer-readable storage medium and executed by a computer, making the computer function as:

a music piece selecting period setting unit which sets plural music piece selecting periods based on user's own information;

a music piece reproduction list producing means which produces a music piece reproduction list based on the user's own information for each of the music piece electing period;

a reproducing unit which reproduces the music pieces according to the music piece reproduction list; and an evaluation information inputting means which receives user's evaluation information for the music pieces reproduced by the reproducing means;

wherein the music piece selecting period setting unit changes the plural music piece selecting periods based on the user's evaluation information.

* * * * *